United States Patent Office.

CHARLES S. LOCKWOOD, OF ALBANY, NEW YORK, JOHN W. HYATT AND JOHN H. STEVENS, OF NEWARK, NEW JERSEY, ASSIGNORS TO THE BON-SILATE COMPANY, (LIMITED,) OF ALBANY, NEW YORK.

PROCESS OF TREATING GELATINE WHEN COMBINED WITH TANNIC ACID, &c.

SPECIFICATION forming part of Letters Patent No. 317,390, dated May 5, 1885.

Application filed August 13, 1884. (No specimens.)

*To all whom it may concern:*

Be it known that we, JOHN W. HYATT and JOHN H. STEVENS, citizens of the United States, and residents of Newark, in the county of Essex and State of New Jersey, and CHARLES S. LOCKWOOD, a citizen of the United States, residing at Albany, New York, have invented a certain new and useful Improved Process of Treating Gelatine when Combined with Tannic Acid or Equivalent Astringent Agent, of which the following is a specification.

The invention relates to an improved process of treating gelatine when combined with tannic acid or equivalent astringent agent. Its distinctive novelty consists in combining the gelatine with a tannic acid, drying and comminuting the compound, and then molding it by heat and pressure.

In practice we take gelatine and tannic acid in the proportions of, say, one hundred parts of gelatine to from five to ten parts of tannic acid. The two substances, having been worked together, are dried and comminuted in any convenient way, after which the powder is introduced into heated molds and subjected to pressure to form any desired article. The proportion of tannic acid may be varied, the important consideration being to use a percentage that will make the gelatine most insoluble. The proportions given have been found to be desirable, but need not be rigidly adhered to.

The dies employed will be of usual construction and heated to a temperature of, say, from about 200° to 300° Fahrenheit, and the material will be subjected to a pressure of about, say, two thousand pounds to the square inch, more or less, according to the character of the article, the heat and pressure being continued until a complete solidification of the contents of the mold has been accomplished.

What we claim as new is—

The process of treating gelatine and tannic acid or other equivalent astringent agent herein described, which consists in, first, combining the two in the proportions hereinbefore specified; second, drying and comminuting the compound, and, third, subjecting the desiccated powder to the action of heated molds, substantially as described.

Signed at Albany, in the county of Albany and State of New York, this 2d day of August, A. D. 1884.

CHARLES S. LOCKWOOD.

Witnesses:
ROBERT C. PRUYN,
E. A. GROESBECK.

Signed at Newark, in the county of Essex and State of New Jersey, this 9th day of August, A. D. 1884.

JOHN W. HYATT.

Witnesses:
ABRAHAM MANNERS,
CHAS. C. GILL.

Signed at Newark, in the county of Essex and State of New Jersey, this 9th day of August, A. D. 1884.

JOHN H. STEVENS.

Witnesses:
ABRAHAM MANNERS,
CHAS. C. GILL.